(12) United States Patent
Comanzo et al.

(10) Patent No.: US 6,761,837 B2
(45) Date of Patent: Jul. 13, 2004

(54) EUROPIUM-ACTIVATED PHOSPHORS CONTAINING OXIDES OF RARE-EARTH AND GROUP-IIIB METALS AND METHOD OF MAKING THE SAME

(75) Inventors: Holly Ann Comanzo, Niskayuna, NY (US); Anant Achyut Setlur, Niskayuna, NY (US); Alok Mani Srivastava, Niskayuna, NY (US); Venkatesan Manivannan, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 16 days.

(21) Appl. No.: 10/064,121

(22) Filed: Jun. 12, 2002

(65) Prior Publication Data

US 2003/0230739 A1 Dec. 18, 2003

(51) Int. Cl.[7] ............................................... C09K 11/62
(52) U.S. Cl. ............................... 252/301.4 R; 313/486
(58) Field of Search .................... 252/301.4 R; 313/486

(56) References Cited

U.S. PATENT DOCUMENTS 3,282,856 A * 11/1966 Borchardt ............ 252/301.4 R
6,048,469 A * 4/2000 Xiang et al. .......... 252/301.6 R

FOREIGN PATENT DOCUMENTS

JP  77 (52)-28745 B  *  7/1977

OTHER PUBLICATIONS

Derent Abstract for KR 2002003886 A, Aug. 9, 2002.*
Shigeo Shionoya and William M. Yen (Ed.), "Phosphor Handbook," pp. 367–444, CRC Press, Boca Raton, Florida (1999).
G. Blasse and B.C. Grabmaier, "Luminescent Materials," pp. 108–133, Springer–Verlag, Berlin, Germany (1994).

* cited by examiner

Primary Examiner—C. Melissa Koslow
(74) Attorney, Agent, or Firm—Toan P. Vo; Patrick K. Patnode

(57) ABSTRACT

Europium-activated phosphors comprise oxides of at least a rare-earth metal selected from the group consisting of gadolinium, yttrium, lanthanum, and combinations thereof and at least a Group-IIIB metal selected from the group consisting of aluminum, gallium, indium, and combinations thereof. A method for making such phosphors comprises adding at least a halide of at least one of the selected Group-IIIB metals in a starting mixture. The method further comprises firing the starting mixture in an oxygen-containing atmosphere. The phosphors produced by such a method exhibit improved absorption in the UV wavelength range and improved quantum efficiency.

29 Claims, 4 Drawing Sheets

EUROPIUM-ACTIVATED PHOSPHORS CONTAINING OXIDES OF RARE-EARTH AND GROUP-IIIB METALS AND METHOD OF MAKING THE SAME

FEDERAL RESEARCH STATEMENT

This invention was first conceived or reduced to practice in the performance of work under contract DE-FC26-99FT40632 awarded by the United States Department of Energy. The United States of America may have certain rights to this invention.

BACKGROUND OF INVENTION

The present invention relates to phosphors comprising oxides of rare-earth and Group-IIIB metals activated with trivalent europium and having improved quantum efficiency. In particular, the present invention relates to such phosphors having improved absorption in the ultraviolet wavelengths. The present invention also relates to fluorescent lamps containing such phosphors.

A phosphor is a luminescent material that absorbs radiation energy in a portion of the electromagnetic spectrum and emits energy in another portion of the electromagnetic spectrum. Phosphors of one important class are crystalline inorganic compounds of very high chemical purity and of controlled composition to which small quantities of other elements (called "activators") have been added to convert them into efficient fluorescent materials. With the right combination of activators and host inorganic compounds, the color of the emission can be controlled. Most useful and well-known phosphors emit radiation in the visible portion of the electromagnetic spectrum in response to excitation by electromagnetic radiation outside the visible range. Well-known phosphors have been used in mercury vapor discharge lamps to convert ultraviolet ("UV") radiation emitted by the excited mercury vapor to visible light. Other phosphors are capable of emitting visible light upon being excited by electrons (used in cathode ray tubes) or X rays (for example, scintillators in X-ray detection systems).

The efficiency of a lighting device that uses a phosphor increases as the difference between the wavelength of the exciting radiation and that of the emitted radiation narrows. In low-pressure mercury discharge lamps (also commonly known as fluorescent lamps), excited mercury atoms in the discharge, upon returning to the ground state, mainly emit UV radiation having wavelength of 254 nm (about 12% of the emitted radiation having wavelength of 185 nm). Ideal phosphor for mercury discharge lamps should absorb the 254 nm and 185 nm UV radiation strongly and convert the absorbed radiation efficiently. Effort, therefore, has been expended to produce phosphors for these lamps to be excited by radiation having wavelengths as close to 254 nm as possible. A plurality of phosphors is typically included in a low-pressure mercury discharge lamp to provide white light that simulates sun light. Different blends of phosphors can produce fluorescent lamps with different color temperatures. The color temperature of a light source refers to the temperature of a blackbody source having the closest color match to the light source in question. The color match is typically represented and compared on a conventional CIE (Commission International de l'Eclairage) chromaticity diagram. See, for example, "Encyclopedia of Physical Science and Technology," Vol. 7, 230–231 (Robert A. Meyers (Ed.), 1987). Generally, as the color temperature increases, the light becomes bluer. As the color temperature decreases, the light appears redder. Typical incandescent lamps have color temperature of about 2700 K while fluorescent lamps have color temperature in the range of 3000–6500 K. When the point representing the light source is not exactly on the black body locus of the CIE chromaticity diagram, the light source has a correlated color temperature, which is the temperature on the black body locus which would give nearly the same color to the average human eye.

In addition to correlated color temperature, color rendering index ("CRI") is another important characteristic of the light source. CRI is a measure of the degree of distortion in the apparent colors of a set of standard pigments when measured with the light source in question as opposed to a standard light source. CRI depends on the spectral energy distribution of the emitted light and can be determined by calculating the color shift; e.g., quantified as tristimulus values, produced by the light source in question as opposed to the standard light source. Under illumination with a lamp with low CRI, an object does not appear natural to the human eye. Thus, the better light sources have CRI close to 100. Typically, for color temperatures below 5000 K, the standard light source used is a blackbody of the appropriate temperature. For color temperatures greater than 5000 K, sunlight is typically used as the standard light source. Light sources having a relatively continuous output spectrum, such as incandescent lamps; typically have a high CRI; e.g., equal to or near 100. Light sources having a multi-line output spectrum, such as high pressure discharge lamps, typically have a CRI ranging from about 50 to 80. Fluorescent lamps typically have a CRI in the range of 75–85. Typically, fluorescent lamps have higher color temperature, but lower CRI than incandescent lamps. In general lighting applications, it is desirable to provide light sources having color temperature in the range of 4000–6000 K; i.e., in the range of color temperature of fluorescent lamps.

Typically, a low-pressure mercury fluorescent lamp uses a blend of three phosphors absorbing in the UV range near 254 nm and emitting in the blue, green, and red regions. The colors of the emitted light are blended to provide white light. A commonly used red-emitting phosphor has been $Y_2O_3:Eu^{3+}$, which has a quantum efficiency close to 100%. However, this phosphor requires very high purity $Y_2O_3$, which is expensive.

Therefore, there is a continued need to provide UV-absorbing, red-emitting phosphors that is less expensive to make. In addition, it is very desirable to provide UV-absorbing, red-emitting phosphors that also have high quantum efficiency. It is also very desirable to provide such phosphors in gas discharge lamps.

SUMMARY OF INVENTION

The present invention provides phosphors comprising oxides of rare-earth and Group-IIIB metals of the Periodic Table, activated with trivalent europium that are excitable by electromagnetic ("EM") radiation having wavelengths in the range from about 200 nm to about 400 nm to emit efficiently a visible light in a range of wavelengths from about 580 nm to about 770 nm. An oxide phosphor of the present invention is produced by a method that results in improved quantum efficiency.

According to one aspect of the present invention the oxide phosphors have a formula of $(Gd_{1-x-y}Y_xLa_y)(Al_{1-z-v}Ga_zIn_v)O_3:Eu^{3+}$, wherein $0 \leq x, y, x, v \leq 1$, $0 \leq x+y \leq 1$, and $0 \leq z+v \leq 1$.

A method for making a phosphor comprises oxides of rare-earth and Group-IIIB metals activated with trivalent europium comprises the steps of: (a) providing a mixture of compounds of: (1) at least a rare-earth metal selected from the group consisting of gadolinium, yttrium, and lanthanum, and combinations thereof; (2) europium; and (3) at least a metal of Group IIIB selected from the group consisting of aluminum, gallium, indium, and combinations thereof, wherein at least one of the compounds of at least one Group IIIB metals is a halide; and (b) firing the mixture of compounds at a temperature for a time sufficient to convert the mixture to the phosphor comprising oxides of rare-earth and Group-IIIB metals activated with europium.

According to another aspect of the present invention, a light source comprises a phosphor comprising oxides of rare-earth and Group-IIIB metals activated with trivalent europium. The light source has a correlated color temperature ("CCT") in the range from about 3000 K to about 6500 K and a CRI in the range from about 80 to about 100. The trivalent europium-activated oxide phosphor is excitable by radiation emitted by a discharge contained in the light source and emits visible EM having wavelengths from about 580 nm to about 770 nm.

In one aspect of the present invention, the light source is a mercury discharge lamp.

Other aspects, advantages, and salient features of the present invention will become apparent from a perusal of the following detailed description, which, when taken in conjunction with the accompanying figures, discloses embodiments of the present invention.

DETAILED DESCRIPTION

Figure 1:
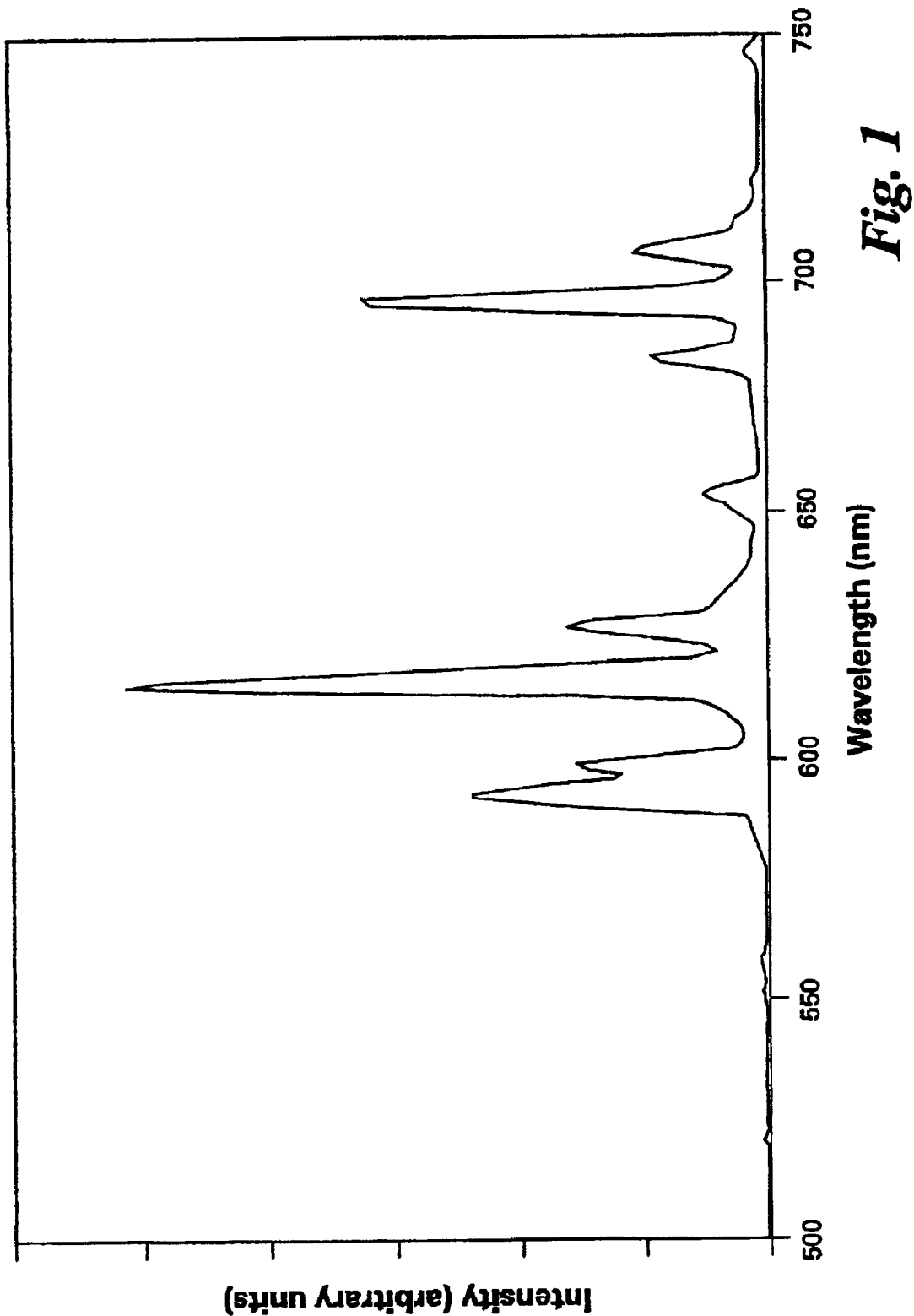
FIG. 1 shows an emission spectrum, under 254 nm excitation, of gadolinium aluminum oxide phosphor activated with 5 percent trivalent europium, produced by a method of the present invention.
Figure 2:
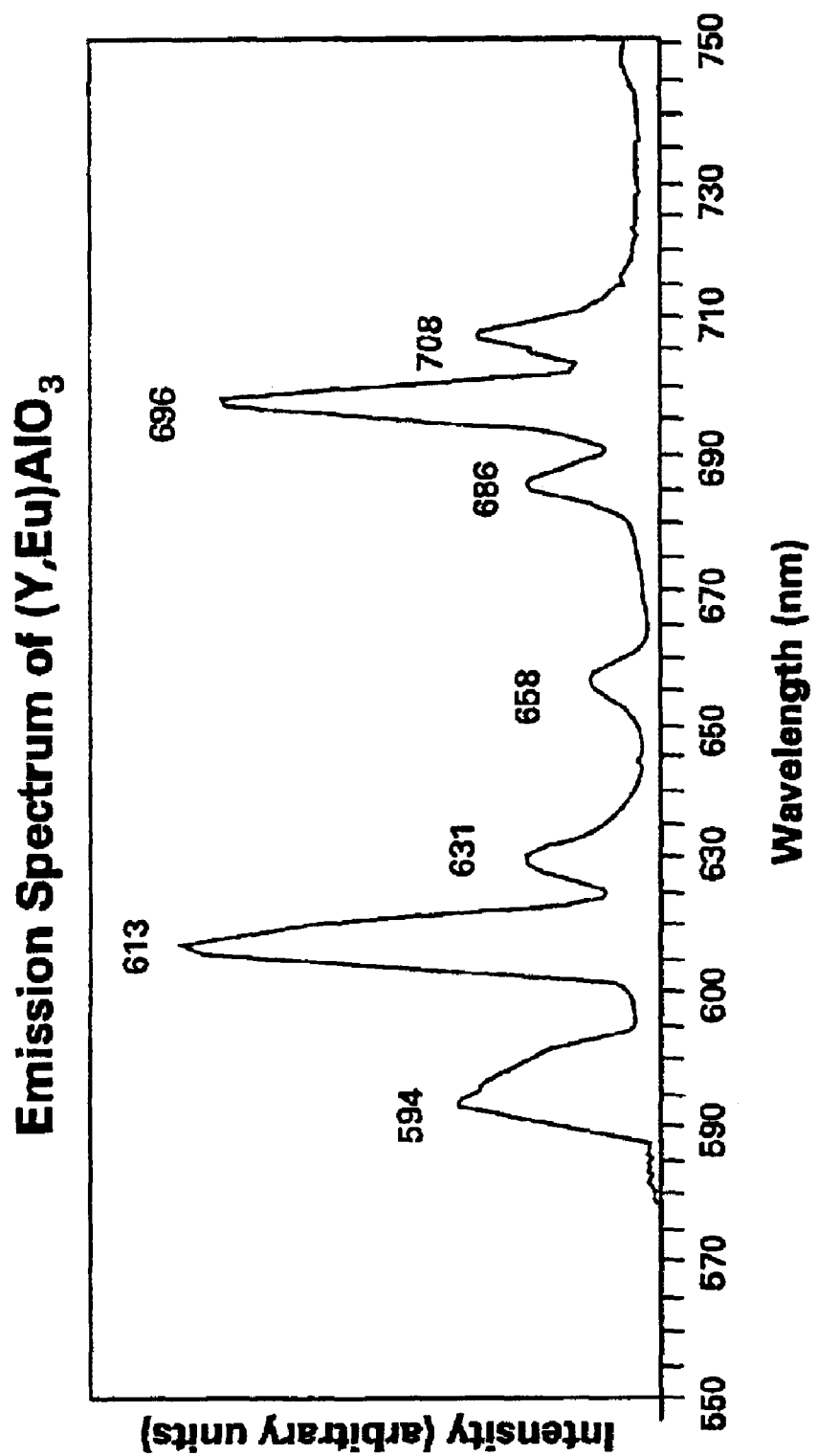
FIG. 2 shows an emission spectrum, under 254 nm excitation, of yttrium aluminum oxide phosphor activated with 10 percent trivalent europium.
Figure 3:
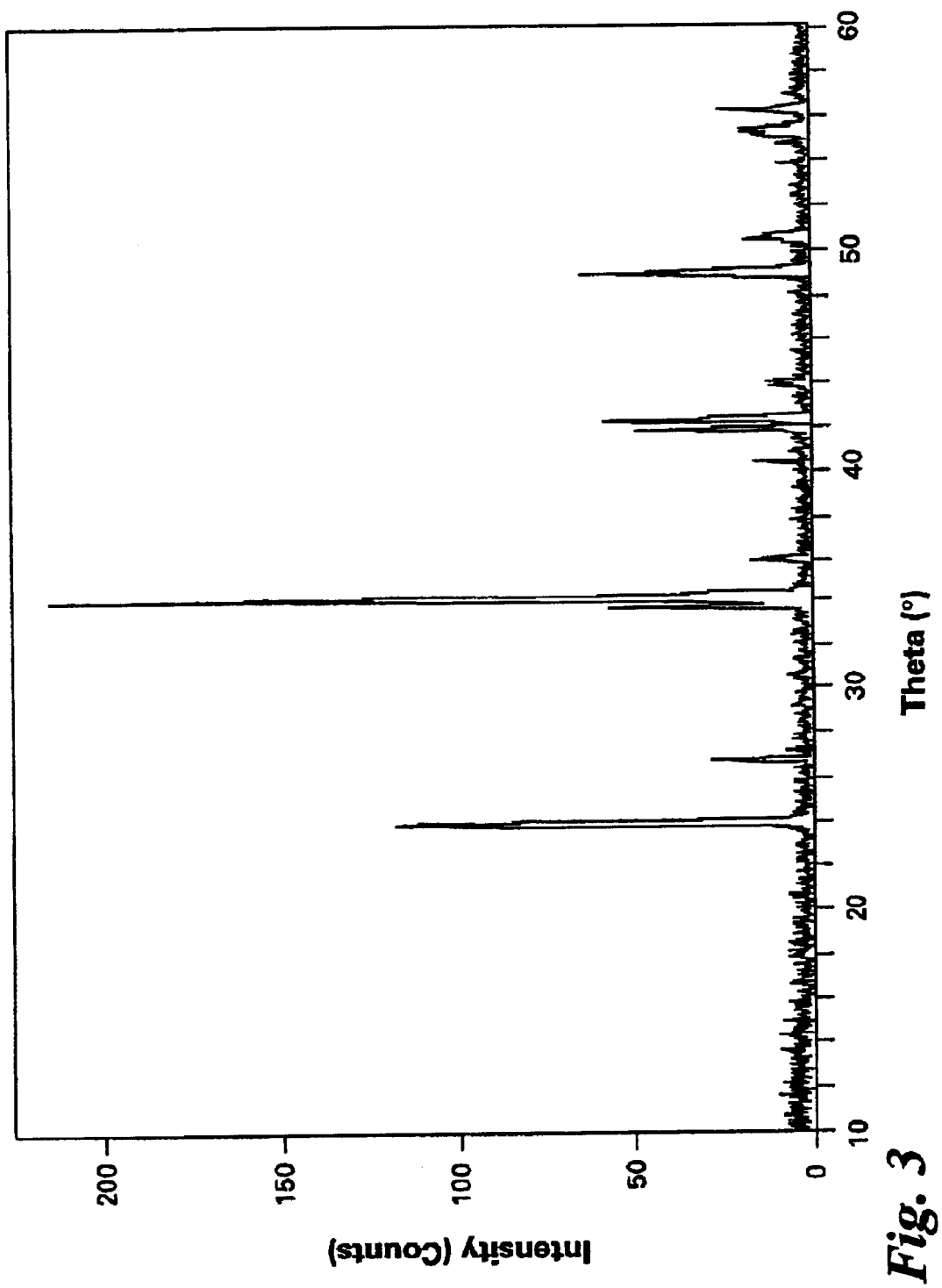
FIG. 3 is a X-ray diffraction spectrum of the yttrium aluminum oxide phosphor.

The present invention provides trivalent europium-activated phosphors comprising oxides of rare-earth and Group-IIIB metals (hereinafter also called "europium-activated rare-earth and Group-IIIB oxide phosphor" or "europium-activated oxide phosphor" or, simply, "oxide phosphor") that have improved quantum efficiency and is excitable by EM radiation having wavelengths in the UV range (from about 200 nm to about 400 nm) to emit efficiently visible light in the wavelength range from about 580 nm to about 770 nm. The terms "EM radiation" or "radiation" and "light" are used interchangeably herein. A major portion of the exciting radiation preferably has wavelengths in the range from about 250 to about 350 nm, more preferably from about 250 nm to about 300 nm. In particular, the trivalent europium-activated rare-earth and Group-IIIB oxide phosphor of the present invention is advantageously applied in a mixture with other selected phosphors to a UV-emitting gas discharge to generate a light source having CCT in the range from about 3000 to about 6500 K and CRI in the range from about 80 to about 100. A trivalent europium-activated rare-earth and Group-IIIB oxide phosphor of the present invention can be included in a phosphor blend to tune the CCT of fluorescent lamps and increase their CRI above that of prior-art fluorescent lamps.

A trivalent europium-activated oxide phosphor has a formula of $(Gd_{1-x-y}Y_xLa_y)(Al_{1-z-v}Ga_zIn_v)O_3:Eu^{3+}$, wherein $0 \leq x, y, x, v \leq 1$, $0 \leq x+y \leq 1$, and $0 \leq z+v \leq 1$. In this formula, the trivalent europium ion written after the colon denotes the activator, which is doped into the oxide host lattice. The europium activator is present in an amount from about 0.0005 to about 20 mole percent, preferably from about 0.0005 to about 10 mole percent, and more preferably from about 0.001 to about 5 mole percent. In one embodiment, a phosphor of the present invention is capable of absorbing at least 80 percent of exciting UV radiation at wavelength of about 254 nm.

A trivalent europium-activated rare-earth and Group-IIIB oxide phosphor of the present invention emits mainly in the red to deep red spectral region of visible light; i.e., mainly in wavelengths from about 600 nm to about 770 nm. By mixing an appropriate proportion of a phosphor of the present invention with phosphors emitting in other regions of the visible spectrum, composites of spectra may be created that provide a wide range of colors in the visible spectrum. For example, by mixing a phosphor of the present invention with phosphors emitting in the blue and green regions, white light may be produced. Such a white light may be obtained from a source of UV exciting radiation, such as a low-pressure mercury discharge lamp.

Non-limiting examples of blue-emitting phosphors are $BaMgAl_{10}O_{17}:Eu^{2+}$, $Sr_5(PO_4)_3Cl:Eu^{2+}$, $Sr_4Al_{14}O_{25}:Eu^{2+}$, $Sr_3(PO_4)_5Cl:Eu^{2+}$, and $Sr_2Al_6O_{11}:Eu^{2+}$. Non-limiting examples of green-emitting phosphors are $CeMgAl_{11}O_{17}:Tb^{3+}$, $(Ce,La)PO_4:Tb^{3+}$, $(Ce,Gd)MgB_5O_{10}:Tb^{3+}$, and $LaPO_4:Ce^{3+}$, $Tb^{3+}$. Non-limiting examples of red-emitting phosphors are $Y_2O_3:Eu^{3+}$, $YBO_3:Eu^{3+}$, and $3.5MgO.0.5MgF_2.GeO_2:Mn^{4+}$.

By mixing appropriate proportions of phosphors, a composite emission spectrum of the blend may be created that provides a desired CCT and CRI with high luminosity (as defined by the lumens per watt of electrical input energy). Compositions of phosphor blends may be chosen to provide emission of white light having coordinates close to the black body locus of the CIE chromaticity diagram. The phrase "close to the black body locus" means that the point representing the composite light is located at a distance less than or equal to 0.0054 from the black body locus. In general lighting applications, it is desirable to provide light sources having CCT in the range of about 3000 K to about 6000 K. This need has been largely satisfied with fluorescent lamps, which are more energy-efficient than incandescent lamps. However, these lamps typically have CRIs in the range of about 75 to about 85. Thus, it is very desirable to provide fluorescent lamps in this range of CCTs that have higher CRIs so that objects illuminated by these lamps appear more natural to the human eyes. Such light sources can be obtained by incorporating a phosphor blend comprising a red-emitting phosphor of the present invention in a UV-emitting radiation source, such as a low-mercury discharge.

In addition to white light, light of other colors may be generated from other blends of phosphors that comprise a red-emitting phosphor of the present invention.

In one preferred embodiment, the trivalent europium-activated oxide phosphor $GdAlO_3:Eu^{3+}$, wherein $Eu^{3+}$ is present in an amount of less than about 5 mole percent. FIG. 1 shows an emission spectrum of this phosphor under 254 nm UV excitation.

A trivalent europium-activated rare-earth and Group-IIIB oxide phosphor of the present invention may be made by a solid-state reaction. For example, appropriate amounts of oxides and/or salts of (a) at least a rare-earth metal selected from the group consisting of gadolinium, yttrium, lanthanum, and combinations thereof; (b) europium; and (c) at least a Group-IIIB metal selected from the group consisting of aluminum, gadolinium, indium, and combinations thereof are mixed together. At least one compound of said Group-IIIB metals is a halide. The preferred halide is fluoride. Typically, an amount of a Group-IIIB metal halide is provided such that it contributes from about 1 to about 25 atom percent of the total Group-IIIB metal. The amounts of the various compounds are chosen so as to achieve the final desired composition of the phosphor. The mixture is fired at a temperature from about 1000° C. to about 1500° C. in air, preferably from about 1000° C. to about 1300° C. The mixture may be first fired at an appropriate lower temperature, such as between about 400° C. and about 900° C., to decompose the oxide or salt precursors to the desired oxide compounds. The firing is typically carried out in an oxygen-containing atmosphere, such as oxygen, air, or a mixture of oxygen and an inert gas such as nitrogen, helium, argon, krypton, and/or xenon. The firing atmosphere may even be doped with other gases, if desired. The firing may done in stages at two or more temperatures, each stage may be carried out in a different atmosphere.

Alternatively, the phosphor may be produced in a wet method. One or more compounds of europium, rare-earth metals, and Group-IIIB metals may be other than oxides that are soluble in an aqueous solution, such as nitrates, sulfates, acetates, citrates, chlorates, perchlorates, oxyhalides, or organic compounds. Non-limiting examples of these organic compounds are the metal salts of mono- and di-carboxylic acids containing 1 to 6 carbon atoms, esters of di-carboxylic acids containing 1 to 6 carbon atoms, metal salts of aromatic acids having 1 or 2 aromatic rings, metal acetylacetonates, metal alkoxides containing 1 to 6 carbon atoms, and metal phenoxides. For example, compounds of europium, at least a rare-earth metals selected from the group consisting of gadolinium, yttrium, lanthanum, and combinations thereof, and at least a Group-IIIB metal selected from the group consisting of aluminum, gallium, indium, and combinations thereof are blended and dissolved in an acid, such as nitric acid solution. In one embodiment of the present invention, at least one of the Group-IIIB compounds is a halide, preferably fluoride. The strength of the acid solution is chosen to rapidly dissolve the compounds and the choice is within the skill of a person skilled in the art. Ammonium hydroxide is then added in increments to the acidic solution containing these metals while stirring to precipitate a mixture of hydroxides containing the chosen elements until the precipitation is complete. Typically, this step is complete when the pH of the resulting mixture of the solutions rises above 8. Other ammonium compounds, such as ammonium carbonate or ammonium oxalate, can also be used for the precipitation of compounds of the chosen elements. An organic base; such as methanolamine, ethanolamine, propanolamine, dimethanolamine, diethanolamine, dipropanolamine, trimethanolamine, triethanolamine, or tripropanolamine; may be used in place of ammonium hydroxide. The precipitate is filtered, washed, and optionally dried in air. The precipitate may be heated in air at between about 400° C. and about 900° C. for a sufficient time to ensure a substantially complete dehydration of the material and decomposition of any organic materials used. It may be desired to mill or pulverize the dried precipitate before such heating. After decomposition, the mixture comprises substantially oxides of europium; at least a rare-earth metal selected from the group consisting of gadolinium, yttrium, lanthanum, and combinations thereof; and at least a Group-IIIB metal selected from the group consisting of aluminum, gallium, indium, and combinations thereof. The dried precipitate or oxide (after decomposition) is further fired in an oxygen-containing atmosphere at a temperature in the range from about 1000° C. to about 1500° C., preferably from about 1000° C. to about 1300° C., as described above.

Alternatively, said at least a Group-IIIB metal halide is not added into the solution, but instead is added into the precipitate as a dry material. The decomposition and firing of the mixture are then carried out as above.

EXAMPLE

Amounts of $Gd_2O_3$(37.11 g), $Eu_2O_3$(1.90 g), $Al_2O_3$(9.89 g), and $AlF_3$(1.81 g) were intimately mixed using $ZrO_2$ media for about 4 hours. The amount of $AlF_3$ contributed 10 atom percent of the total aluminum. The mixture was fired in an alumina crucible in a box furnace at 1250° C. in air for 5 hours. The phosphor had a formula of $Gd_{0.95}Eu_{0.05}AlO_3$. This phosphor showed a quantum efficiency of about 85–90 percent of that of a standard phosphor ($Y_2O_3$:$Eu^{3+}$) or an absolute quantum efficiency of about 75–80 percent and an absorption of 85 percent of the exciting radiation at 254 nm. In comparison, a phosphor having the same formula that is made without $AlF_3$ showed a quantum efficiency of about 70 percent of the standard phosphor and an absorption of about 70 percent of the exciting radiation at 254 nm.

White Light-Emitting Device

Incorporation of a selected blend comprising a phosphor of the present invention and other phosphors in a gas discharge device, such as a mercury discharge lamp that generates UV radiation in the wavelength range 250–300 nm, provides a white light source that uses electrical energy efficiently. For example, the phosphor blend may be milled or pulverized to a particle size of less than about 4 micrometers, preferably less than about 2 micrometers. The phosphor blend is then applied to the internal surface of the discharge lamp tube as is conventionally done. Light-scattering particles may be added into the phosphor blend to improve light extraction and/or to reduce the unwanted escape of unabsorbed UV radiation. The CCT of the light emitted device is adjusted by adjusting individual amounts of the phosphors in the blend. For example, a higher CCT is achieved by increasing the amount of phosphors having peak emission the range of 400–520 nm. On the other hand, a lower CCT, which would produce a "warmer" light is achieved by increasing the amount of the phosphor sent invention.

Figure 4:
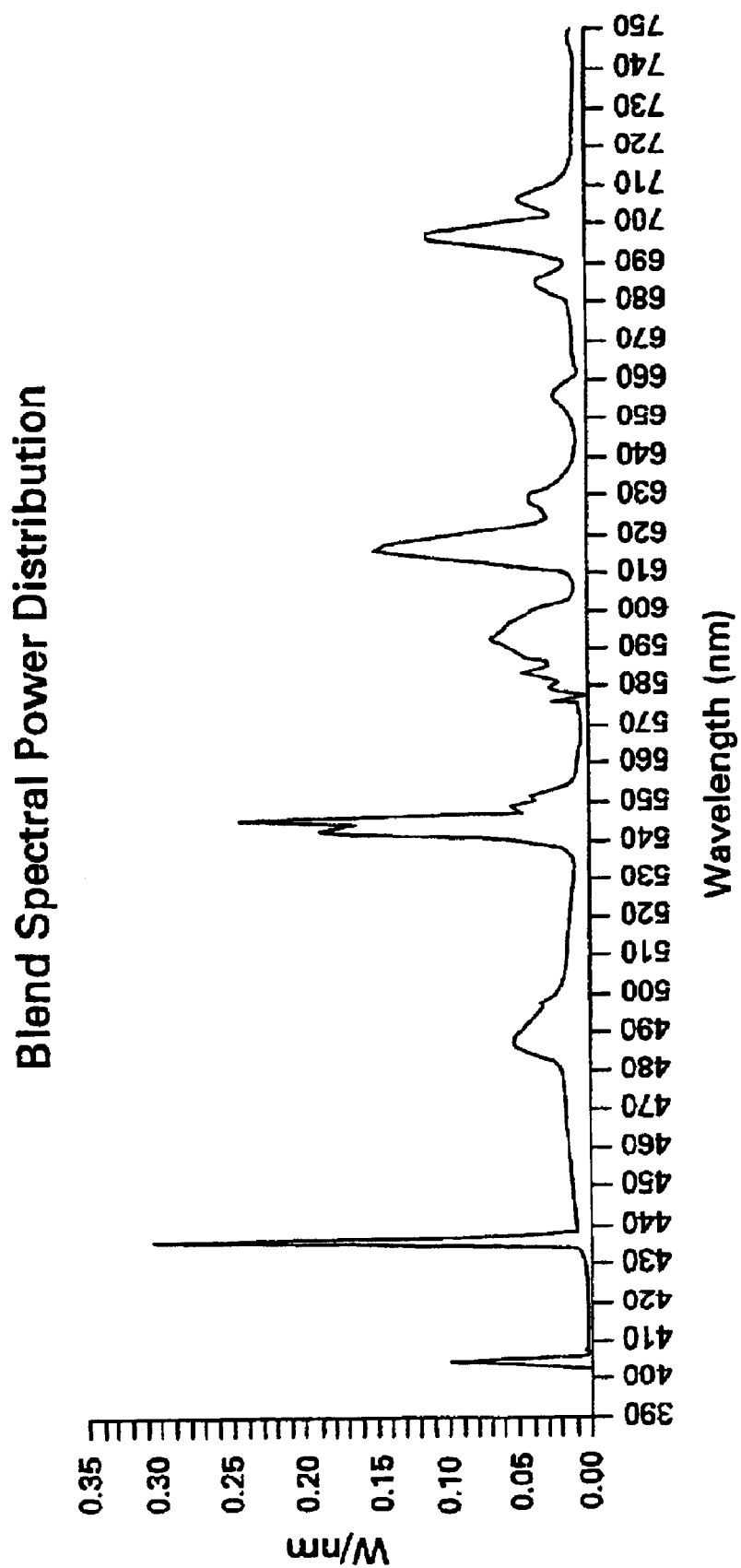
FIG. 4 is a spectral power distribution of a phosphor blend consisting of $YAlO_3:Eu^{3+}$; $LaPO_4:Ce^{3+}$, $Tb^{3+}$; $Sr_5(PO_4)_3Cl:Eu^{2+}$; and $Sr_4Al_{14}O_{25}:Eu^{2+}$.

A simulation of spectral power distribution is shown in FIG. 4 for a phosphor blend consisting of $YAlO_3$:$Eu^{3+}$; $LaPO_4$:$Ce^{3+}$, $Tb^{3+}$; $Sr_5(PO_4)_3Cl$:$Eu^{2+}$; and $Sr_4Al_{14}O_{25}$:$Eu^{2+}$ wherein the contributions to the composite spectrum from the phosphors are 52.3%, 26.5%, 5.3%, and 15.9%, respectively. This phosphor blend provides a CIE color coordinate of (0.38, 0.38), a CCT of 4000 K, luminous outputs of 278.4 lpw (radiant), and a CRI of 92.7.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. An europium-activated oxide phosphor comprising a compound having a formula of $(Gd_{1-x-y}Y_xLa_y)InO_3$: $Eu^{3+}$;

wherein $0 \leq x$, $y \leq 1$, and $0 \leq x+y \leq 1$; said phosphor being capable of absorbing UV radiation and emitting in a visible wavelength range from about 580 nm to about 770 nm; wherein europium is present in an amount from about 0.0005 to about 20 mole percent.

2. The phosphor of claim 1, wherein europium is present in an amount from about 0.0005 to about 10 mole percent.

3. The phosphor of claim 1, wherein europium is present in an amount from about 0.001 to about 5 mole percent.

4. A phosphor blend comprising a trivalent europium-activated oxide phosphor comprising a compound having a formula of $(Gd_{1-x-y}Y_xLa_y)InO_3$: $Eu^{3+}$; wherein $0 \leq x$, $y \leq 1$, and $0 \leq x+y \leq 1$; said phosphor blend absorbing EM radiation substantially in a wavelength range from about 250 nm to about 400 nm.

5. The phosphor blend of claim 4, wherein said phosphor blend further comprising at least one other phosphor substantially emits in a visible wavelength range other than a range from about 580 nm to about 770 nm.

6. The phosphor blend of claim 4, wherein said phosphor blend emits white light upon being excited by UV EM radiation.

7. The phosphor blend of claim 4, wherein said white light has color coordinates substantially on a black body locus of a CIE chromaticity diagram.

8. A light source comprising:
   (a) a source of gas discharge; and
   (b) a phosphor blend comprising a trivalent europium-activated oxide phosphor comprising a compound having a formula of $(Gd_{1-x-y}Y_xLa_y)InO_3$: $Eu^{3+}$; wherein $0 \leq x$, $y \leq 1$, and $0 \leq x+y \leq 1$; said phosphor blend absorbing EM radiation from said gas discharge in a wavelength range from about 250 nm to about 400 nm and emitting light in a visible range.

9. The light source of claim 8, wherein said phosphor blend further comprises at least an additional phosphor selected from one of the groups consisting of:
   $BaMgAl_{10}O_{17}$:$Eu^{2+}$, $Sr_5(PO_4)_3Cl$:$Eu^{2+}$, $Sr_4Al_{14}O_{25}$:$Eu^{2+}$, $Sr_3(PO_4)_5Cl$:$Eu^{2+}$, $Sr_2Al_6O_{11}$:$Eu^{2+}$, and mixtures thereof;
   $CeMgAl_{11}O_{17}$:$Tb^{3+}$, $(Ce,La)PO_4$:$Tb^{3+}$, $(Ce,Gd)MgB_5O_{10}$:$Tb^{3+}$, $LaPO_4$:$Ce^{3+}$,$Tb^{3+}$; and mixtures thereof; and
   $Y_2O_3$:$Eu^{3+}$, $YBO_3$:$Eu^{3+}$, $3.5MgO.0.5MgF_2.GeO_2$:$Mn^{4+}$, and mixtures thereof.

10. A method for making an europium-activated rare-earth and Group-IIIB oxide phosphor, said method comprising:
   (a) providing a mixture of:
      (1) at least a compound of at least a rare-earth metal selected from the group consisting of gadolinium, yttrium, lanthanum, and combinations thereof;
      (2) at least a compound of europium: and
      (3) at least a compound of at least a Group-IIIB metal selected from the group consisting of aluminum, gallium, indium, and combinations thereof; wherein at least one compound of said at least a Group-IIIB metal is a halide; and
   (b) firing said mixture in an oxygen-containing atmosphere at a temperature and for a time sufficient to convert said mixture into said trivalent europium-activated gadolinium aluminum oxide phosphor.

11. The method of claim 10, wherein said at least a compound of said at least a rare-earth metal is an oxygen-containing compound.

12. The method of claim 10, wherein said at least a compound of said europium is an oxygen-containing compound.

13. The method of claim 10, wherein said at least a compound of said at least a Group-IIIB metal is an oxygen-containing compound.

14. The method of claim 10, wherein said halide is fluoride.

15. The method of claim 10, wherein said halide provides from about 1 to about 25 atom percent of a total amount of said at least a Group-IIIB metal.

16. A method for making a trivalent europium-activated rare-earth and Group-IIIB oxide phosphor, said method comprising:
   (a) providing a first solution which comprises:
      (1) at least a compound of at least a rare-earth metal selected from the group consisting of gadolinium, yttrium, lanthanum, and combinations thereof;
      (2) at least a compound of europium; and
      (3) at least a compound of at least a Group-IIIB metal selected from the group consisting of aluminum, gallium, indium, and combinations thereof; wherein at least one of said at least a compound of said at least a Group-IIIB metal is a halide;
   (b) providing a second solution comprising a material selected from the group consisting of ammonium hydroxide, ammonium carbonate, ammonium oxalate, methanolamine, ethanolamine, propanolamine, dimethanolamine, diethanolamine, dipropanolamine, trimethanolamine, triethanolamine, tripropanolamine, and mixtures thereof;
   (c) combining said first solution and second solution to produce a precipitate comprising said at least a rare-earth metal, said europium, and said at least a Group-IIIB metal; and
   (d) firing said precipitate at a temperature for a time sufficient to convert said precipitate to said trivalent europium-activated rare-earth and Group-IIIB oxide phosphor.

17. The method of claim 16, wherein said halide provides from about 1 to about 25 atom percent of a total amount of said at least a Group-IIIB metal.

18. The method of claim 17, wherein said halide is fluoride.

19. The method of claim 16, wherein said second solution comprises ammonium hydroxide.

20. The method of claim 16 further comprising the step of heating said precipitate in an oxygen-containing atmosphere before the step of firing to convert said precipitate to a mixture of oxygen-containing compounds of said at least a rare-earth metal, europium, and said at least a Group-IIIB metal.

21. The method of claim 20, wherein said step of heating is carried out at a temperature in a range from about 400° C. to about 900° C.

22. The method of claim 20, further comprising the step of pulverizing said mixture of oxygen-containing compounds after said step of heating and before said step of firing.

23. A method for making a trivalent europium-activated gadolinium aluminum oxide phosphor, said method comprising:
   (a) providing a first solution which comprises:
      (1) at least a compound of at least a rare-earth metal selected from the group consisting of gadolinium, yttrium, lanthanum, and combinations thereof;
      (2) at least a compound of europium; and
      (3) at least a compound of at least a Group-IIIB metal selected from the group consisting of aluminum, gallium, indium, and combinations thereof;

(b) providing a second solution comprising a material selected from the group consisting of ammonium hydroxide, ammonium carbonate, ammonium oxalate, methanolamine, ethanolamine, propanolamine, dimethanolamine, diethanolamine, dipropanolamine, trimethanolamine, triethanolamine, tripropanolamine, and mixtures thereof;

(c) combining said first solution and second solution to produce a precipitate comprising said at least a rare-earth metal, europium, and said at least a Group-IIIB metal;

(d) adding at least a halide of said at least a Group-IIIB metal to said precipitate to form a Group-IIIB halide-containing precipitate; and (e) firing said Group-IIIB halide-containing precipitate at a temperature for a time sufficient to convert said Group-IIIB halide-containing precipitate to said trivalent europium-activated rare-earth and Group-IIIB oxide phosphor.

24. The method of claim 23, wherein said at least a halide is a fluoride.

25. The method of claim 23, wherein said at least a halide provides from about 1 to about 25 atom percent of a total amount of said at least a Group-IIIB metal.

26. The method of claim 23, wherein said second solution comprises ammonium hydroxide.

27. The method of claim 23 further comprising the step of heating said at least a Group-IIIB halide-containing precipitate in an oxygen-containing atmosphere before the step of firing to convert said at least a Group-IIIB halide-containing precipitate to a mixture of oxygen-containing compounds of said at least a rare-earth metal, europium, and said at least a Group-IIIB metal.

28. The method of claim 27, wherein said step of heating is carried out at a temperature in a range from about 400° C. to about 900° C.

29. The method of claim 28, further comprising the step of pulverizing said mixture of oxygen-containing compounds after said step of heating and before said step of firing.

* * * * *